United States Patent
Muller et al.

(10) Patent No.: US 7,233,936 B1
(45) Date of Patent: Jun. 19, 2007

(54) ARTIFICIAL INTELLIGENCE SYSTEMS FOR CLASSIFYING EVENTS, OBJECTS AND SITUATIONS

(75) Inventors: Denis Muller, Clairefontaine (FR); Stéphanie Muller Carceles, Clairefontaine (FR)

(73) Assignee: Commissariat a l'Energie Atomique, Paris (FR)

( * ) Notice: Subject to any disclaimer, the term of this patent is extended or adjusted under 35 U.S.C. 154(b) by 710 days.

(21) Appl. No.: 10/009,335

(22) PCT Filed: Jun. 28, 2000

(86) PCT No.: PCT/FR00/01804

§ 371 (c)(1),
(2), (4) Date: Dec. 7, 2001

(87) PCT Pub. No.: WO01/03064

PCT Pub. Date: Jan. 11, 2001

(30) Foreign Application Priority Data

Jul. 1, 1999 (FR) .................................. 99 08472

(51) Int. Cl.
*G06F 9/44* (2006.01)
*G06F 15/18* (2006.01)
*G06G 7/00* (2006.01)

(52) U.S. Cl. .......................................... 706/52; 706/2
(58) Field of Classification Search ................. 706/2, 706/52
See application file for complete search history.

(56) References Cited

U.S. PATENT DOCUMENTS 5,267,348 A * 11/1993 Someya et al. ............... 706/52
5,544,256 A * 8/1996 Brecher et al. ............. 382/149
5,784,534 A * 7/1998 Viot .............................. 706/4

FOREIGN PATENT DOCUMENTS

EP 0 468 229 1/1992

OTHER PUBLICATIONS

Yang et al, "Development od a Miniatured IV Drip Rate Meter Using Optical Sensors and Fuzzy Rules Based Detection Algorithm", IEEE International Conference in Medicine and Biology Society, 1998.*
Chu, et al., "First Break Refraction Event Picking Using Fuzzy Logic Systems", vol. 2, No. 4, 12 pages.
Magotra, et al., "Seismic Signal Discrimination Using Adaptive System Parameters", 1991, 5 pages.

* cited by examiner

*Primary Examiner*—George Davis
(74) *Attorney, Agent, or Firm*—Thelen Reid & Priest LLP

(57) ABSTRACT

The present invention relates to a system of artificial intelligence for the classification of events, objects or situations from signals and discriminant parameters produced by models comprising at least one processing branch comprising a fuzzy expert system making a decision according to high level properties and discriminant parameters of low level extracted from signals by signal processing type procedures, and capable of explaining its decision to the user through the intermediary of rules selected by order of applicability.

3 Claims, 12 Drawing Sheets

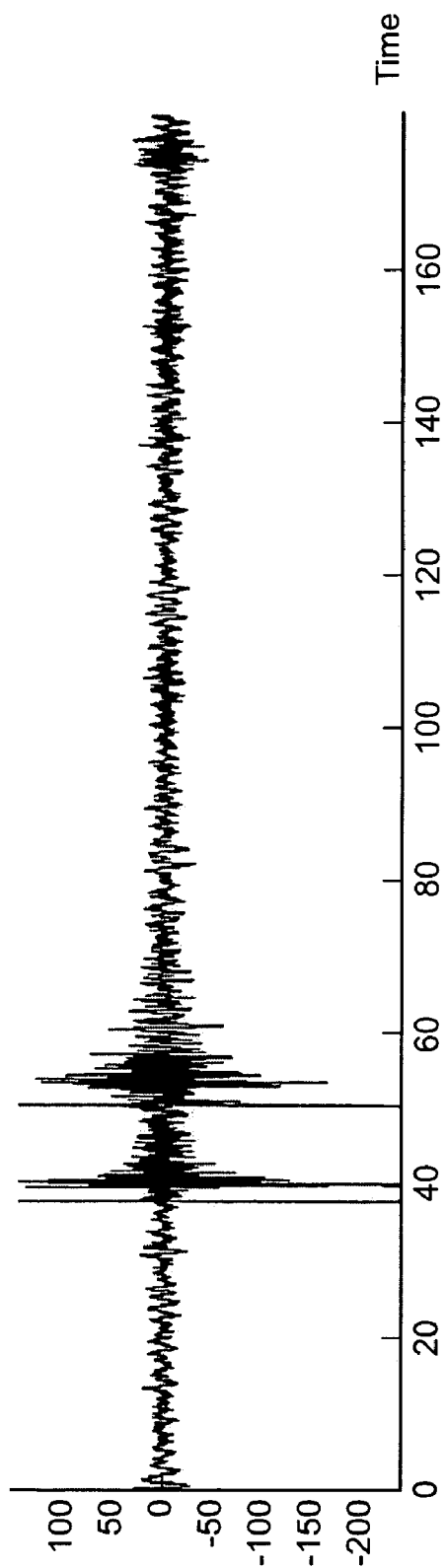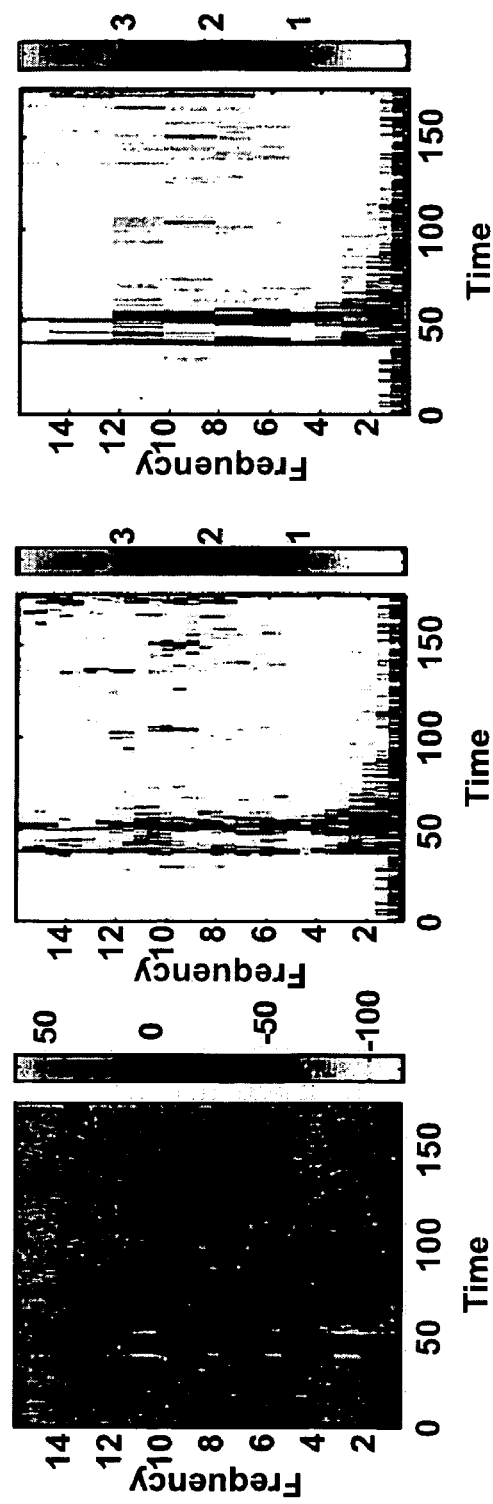
FIG. 12A
FIG. 12C
FIG. 12D
FIG. 12B

ARTIFICIAL INTELLIGENCE SYSTEMS FOR CLASSIFYING EVENTS, OBJECTS AND SITUATIONS

TECHNICAL FIELD

The present invention relates to a system of artificial intelligence for the classification of events, objects or situations from signals and discriminant parameters produced by models.

In particular, the invention applies to the classification of seismic events. Such a classification will be considered as a non-limiting example in the following description.

STATE OF PRIOR ART

Automatic Classification of Seismic Events

Automatic classification of seismic events is a relatively recent problem, since the problem was only really approached in the 1980's. These works were generally oriented towards the search for discriminant parameters (that is say making classification possible) in seismic signals. Many potential characteristics were proposed with a view to future automatic classification. After 1990, attempts to carry out automatic classification began to appear in published articles, either using neural techniques or rule-based systems. These works sought to separate earthquakes of natural origin from explosions. None of these articles processes the discrimination of rock failure in the mining industry ("rock bursts").

Because of the complexity of the problem, these articles clearly demonstrate the need for perfecting automatic systems capable of learning. Neural methods are therefore often proposed to carry out automatic discrimination of seismic events, but with limitations analysed below. The models suggested most often are multilayer perceptrons with complete connections between successive layers.

All these articles seek to determine the origin of the earthquake starting from characteristics extracted solely from the signals. The highest level data (date, time, latitude, longitude, magnitude etc.) are never used for classification. But seismologists know the difficulty of discriminating seismic signals through low level processing alone.

Works by Baumgardt et al. are without doubt those which have contributed to making the greatest advances in the search for discriminant parameters. D. R. Baumgardt and K. A. Ziegler, "Spectral evidence for source multiplicity in explosions: application to regional discrimination of earthquake and explosion" (Bulletin of Seismological Society of America, vol. 78, pp. 1773-1795, 1988).

The variations of the cepstrum, the cepstrum of a signal x being the inverse Fourier transform of the logarithm of the Fourier transform of x, are often used. It can thus be shown that the cepstrum makes it possible to visualise the phenomenon of micro-delays present in the blast signals characterised by a greater variance. A study also notes this property, nonetheless pointing out that the absence of this characteristic does not permit any deduction concerning the class of the event. P. S. Dysart and J. J. Pulli, "Regional seismic event classification at the NORESS array: seismological measurement and the use of trained neural networks" (Bulletin of Seismological Society of America, vol. 80, pp 1910-1933, 1990).

The ratios of the amplitudes of the different types of waves can also serve as discriminants. A published document studies a whole series of amplitude ratios ($P_n/L_g$, $P_g/L_g$, $L_g/R_g$). These ratios are described as being able to provide good discrimination. P. W. Pomeroy, W. J. Best and T. V. McEvilly, "Test ban treaty verification with regional data: a review" (Bulletin of Seismological Society of America, vol. 72, n°6, pp S89-5129, 1982).

The same authors also introduce ratios of spectral densities of power of the different types of waves detected. Just like the amplitude ratios, these discriminants are used by all the studies seeking discriminants in seismic signals. In order to characterise the explosions, ratios have also been used for power spectral densities of one wave type, S here, for bands of different frequencies, that is to say the ratio of the power spectral density of S in the range 1-2 Hz to the power spectral density of this same phase in the 7-20 Hz band. The ratio between the power spectral densities of the S wave below and above 10 Hz is also given as a good separator between explosions and earthquakes.

The propagation time of signals from a mine has a constant time $t_{Sg}-t_{Pg}$ for a given recording station. This propagation time is presented as a potential characteristic for a mine, nevertheless remaining less reliable than the preceding characteristics. M. Musil et A. Plesinger, "Discrimination between local microearthquakes and quarry blasts by multilayer perceptrons and Kohonen maps" (Bulletin of Seismological Society of America, vol. 86, n°4, pp. 1077-1090, 1996).

A study suggests using the presence of the surface wave from earthquakes to discriminate them from nuclear explosions at regional distances. S. R. Taylor, "Discrimination between nuclear explosions and earthquakes" (Energy and Earth Sciences, pp. 56-57, 1990). Characterisation of the presence of a surface wave is made indirectly by comparing the magnitudes $m_b$ and $M_s$. For two seismic events of the same magnitude $m_b$, the magnitude of the surface wave $M_s$ is generally higher in the case of an earthquake because of the presence of the surface wave than in the case of an explosion. In fact, this crustal Rayleigh wave enters into the calculation of the magnitude $M_s$ and its presence is subordinate to the phenomenon of shearing, absent in the case of nuclear explosions. Representation of the difference ($m_b-M_s$) as a function of $m_b$ makes it possible to verify this hypothesis. Nevertheless, the calculation of the magnitude $M_s$ depends on the periodicity of the signal recorded and it is not possible to be rigorous for regional events. On the contrary, the presence of a surface wave corresponding to a sedimentary Rayleigh wave in close seismic signals, characterises events of an artificial nature. A detection method for this second type of surface wave consists of searching for its presence directly in the spectrogram of the signal, its frequency being known (between 0.5 and 1.5 Hz) and its supposed time of arrival can be calculated from its average speed of propagation and the distance separating the epicentre from the recording station.

The systems described in documents of prior art are not operationally credible for several reasons:

- studies carried out by geophysicists, usually rich and detailed concerning proposals for discriminant parameters, do not suggest any reliable method for automatic exploitation of these parameters.
- studies carried out by computer specialists propose systems that do not take sufficient account of the complementarity of data and geophysical knowledge.

Most of prior art studies use data bases of seismic events of extremely reduced size, with the consequence that they do not permit correct statistical learning. Classification is usually carried out on bases with fewer than one hundred events, P. S. Dysart and J. J. Pulli, "Regional seismic event classification at the NORESS array: seismological measurement and the use of trained neural networks" (Bulletin of Seismological Society of America, vol. 80, pp 1910-1933, 1990) and F. U. Dowla, S. R. Taylor and R. W. Anderson, "Seismic discrimination with artificial neural networks: preliminary results with regional spectral data" (Bulletin of Seismological Society of America, vol. 80, n°5, pp. 1346-1373, 1990). One of the biggest bases found in prior art documents comprises only 312 events. M. Musil et A. Plesinger, "Discrimination between local microearthquakes and quarry blasts by multilayer perceptrons and Kohonen maps" (Bulletin of Seismological Society of America, vol. 86, n°4, pp. 1077-1090, 1996). The direct consequence is that the margins of error for the results presented are very high, which cannot provide great confidence in these results.

The geographic spread of the examples in the data base is a very important element. Most bases group together events which have taken place in regions of restricted size (several tens of kilometers per side), where the geological properties under ground have little diversity. The search for general discriminants is therefore biased, the discriminants only being effective for a given region.

Moreover, the events of the two classes to be discriminated can come from two clearly distinct geographic regions, sometimes as far apart as several hundreds of kilometers. D. R. Baumgardt and K. A. Ziegler, "Spectral evidence for source multiplicity in explosions: application to regional discrimination of earthquake and explosion" (Bulletin of Seismological Society of America, vol. 78, pp. 1773-1795, 1988). It is therefore impossible to know to what extent the "colouring" of the signals by the geological layers travelled through influences the discrimination, rather than the signals themselves. But seismologists know that this "colouring" is far from negligible and that localisation information is very important.

Generally, a very limited number of recording stations is used. The signals are recorded by two or three stations at maximum, but usually by only one single station. The seismic event is thus represented by a single signal, which reduces usable information considerably.

Finally, the events integrated into the data base are very generally selected according to previously defined criteria: magnitude greater than a certain threshold, signal/noise ratio greater than a certain threshold. P. S. Dysart and J. J. Pulli, "Regional seismic event classification at the NORESS array: seismological measurement and the use of trained neural networks" (Bulletin of Seismological Society of America, vol. 80, pp 1910-1933, 1990). But this selection evidently biases the results completely.

Although prior art studies have made it possible to register a wide range of potentially useful discriminants for classification, it has proved to be very difficult to find efficient global discriminants because of the high number of distinct types of blasting and earthquakes.

In most cases, the classifiers proposed turn out to be inefficient because they are too simple (linear separators) or impossible to regulate because of their complexity. They demand enormous work on pre-processing the data, which means that the systems proposed cannot be generalised.

Example of Seismic Surveillance

The detection and geophysical laboratory (LDG) of the CEA has continuously surveyed the seismic activity of the earth since 1962. When a seismic event occurs in any spot on the globe, it is recorded in France by a network of forty-two vertical seismometers located on mainland territory, as shown in FIG. 1, the SP stations being short-period stations and the LP stations being long-period stations. A detailed description of the network of seismometers and the propagation of seismic waves in France is given. M. Nicolas, J.-P. Santoire and P.-Y. Delpech "Intraplate seismicity: new seismotectonic data in western Europe" (Tectonophysics, N° 179, pp. 27-53, 1990).

This network, which since its creation, used transmission by Hertzian channels, has recently moved to digital transmission by satellite. Filtering and a gain adapted to the signal make it possible to detect close earthquakes or on the other hand longer period distant earthquakes called teleseisms. The regulation of filtering parameters and gain must make it possible to find a compromise between the detection of seismic events of relatively low magnitude and background noise.

FIG. 2 shows signals recorded by seismometers of the LDG laboratory located between 84 and 146 kilometers (that is SBF: 84 km; PGF: 110 km; FRF: 127 km; LMR: 136 km and LRG: 148 km) from the estimated epicentre of an earthquake of magnitude 1.9 located 10 kilometers south of Imperia in Italy on May 9, 1996 (time: 1 hr 0 min 59 sec; latitude: 43.34; longitude: 8.19; magnitude: 1.9).

Different seismic phases are indexed on each signal, which will be used for the detailed analysis of the event.

Each year, about 9,000 close seismic events are thus detected, of which 800 to 1,200 are natural earthquakes.

The seismologists of the LDG laboratory process and analyse daily the data recorded by the stations of the French network. They publish a weekly bulletin containing the whole of the natural earthquakes in France or in the bordering regions. A similar bulletin is published for teleseisms. Table I, given at the end of the description, is an extract from the bulletin for the period from Sep. 9 to 15, 1998. In this table, there are the following abbreviations:

TIME OR.: time of origin (TU);

LAT: latitude of the epicentre (deg.);

LON: longitude of the epicentre (deg.);

DEP: depth of the epicentre (km);

LM: local magnitude;

MSE: mean square error (s).

This table thus comprises the ensemble of close earthquakes detected during this week and the characteristics of each event: date and time of origin, position and depth of the epicentre, magnitude, mean square error for the localisation and deduced localisation region.

Because of the great imbalance between the number of artificial events and that of natural events (in France, seismic events of artificial origin are ten times more frequent than natural seismic events), only events presumed to be earthquakes or events of non-determined class are extracted from the background noise by seismologists in order to be analysed more precisely later by a localisation software. The other signals (mainly artificial events) are archived for six months.

The procedure for analysing the signals comprises an already automated localisation, followed by a characterisation phase (determination of the event at the origin of the signals).

The analysis of the signals is carried out using a global system illustrated in FIG. 3.

The aim of the invention is to compensate for the inconveniences of prior art systems by proposing a new system of artificial intelligence for classifying events, objects or situations from signals and discriminant parameters produced by models.

DESCRIPTION OF THE INVENTION

The present invention relates to a system of artificial intelligence for the classification of events, objects or situations from signals and discriminant parameters produced by models, characterised in that it comprises at least one processing branch comprising a fuzzy expert system (FES expert) taking a decision according to high level properties and lower level discriminant parameters extracted from signals by signal processing type procedures, and capable of explaining its decision to the user through the intermediary of rules selected by order of applicability.

In this fuzzy expert system a gradient decrease is carried out on the parameters:

$x = y/\sigma$
$s = \ln/2\sigma^2)$
$r = \ln(\rho)$
$d$ with:
- y: position of fuzzy sets of premises
- σ: width of fuzzy sets of premises
- ρ: weight of rules
- d: degree of activation of each class for each rule.

Advantageously the system according to the invention is a multi-expert system constituted of at least two independent processing branches, organising themselves automatically through statistical learning on the data bases, having particular properties, and merged by a high level decisional system. Advantageously one branch comprises a neuro-fuzzy classifier (NFC expert) taking its decisions from high level properties and lower level discriminant parameters extracted from signals by signal processing type procedures. Advantageously another branch comprises a neural network with local connections and shared weights (TDNN) constituted of banks of non-linear adaptable filters, itself extracting discriminant information for time-frequency representation of the signals corresponding to the event.

The invention can be used in different fields of application and particularly in:

Surveillance of Geophysical Events

The system then applies to the analysis of any geophysical event observable through signals received by the stations:
- seismic signals;
- infrasound;
- hydro-acoustic waves.

These events can be close events (called regional) or distant events (for example, teleseisms).

The function to be ensured may be:
- filtering to eliminate the non-relevant events for later processing;
- detection of special events;
- exhaustive classification into a set of groups of events of the same nature.

Industrial Surveillance and Monitoring

The system also applies to the analysis of objects or industrial processes, as long as one has available signals or images collected by sensors. A few examples are given below:

Quality control of manufactured objects or products: the aim is to verify the shape and/or position of objects, to detect and characterise defects. The NFC and FES detectors use measurements produced by image processing. The TDNN expert uses one or several images of the part.

Predictive maintenance of equipment: the aim is to foresee a future failure of machines, computers, electronic equipment, sensors in order to give a warning and make it possible to implement a correction procedure before breakdown. The NFC and FES experts use measurements of high level coefficients, and correlations. The TDNN expert uses signals.

Complex process surveillance: the aim is to verify that a production chain is operating correctly. NFC and FES experts use measurements of high level coefficients. The TDNN expert uses measurements of low level coefficients.

In the geophysical domain, the high level properties can be the location, the magnitude, the time and the date. The system according to the invention makes it possible to carry out automatic classification of seismic events into three sets:
- natural earthquakes;
- explosions (blasting in mines and military trials);
- rock bursts (collapse of layers in mines).

The system then integrates into a chain of automatic processing to operate a filtering function of seismic events. Its principal characteristics are:
- maximum reliability: the system is able to take decisions even with corrupted or imprecise data, or even in the absence of certain information;
- access to the explanation of decisions in order to avoid any eventual doubt about a decision.

BRIEF DESCRIPTION OF THE DRAWINGS

FIGS. 12A to 12D show successive pre-processing applied to a seismic signal.

DETAILED DESCRIPTION OF EMBODIMENTS

General Description of the System

The system according to the invention comprises at least one processing branch containing a fuzzy expert system. When it comprises several branches of independent processing, one refers to a multi-expert system.

Multi-Expert Decision Making

The principle of multi-expert decision-making, which is thus one of the embodiments of the invention, is the exploitation of the synergy between several complementary processing branches. This complementarity resides in:

A. The general performances: one branch is rather generalised (fairly good performances in most cases), another is rather specialised (very good performance for certain difficult cases, a higher level of errors in cases outside its competence).
B. The performances according to the case treated: one branch can be more able than another for treating a particular case.
C. The nature of inputs (high level signals or data).
D. The nature of outputs (single data for the class, estimation of the certitude of the decision, formal explanation of the decision).

Figure 4:
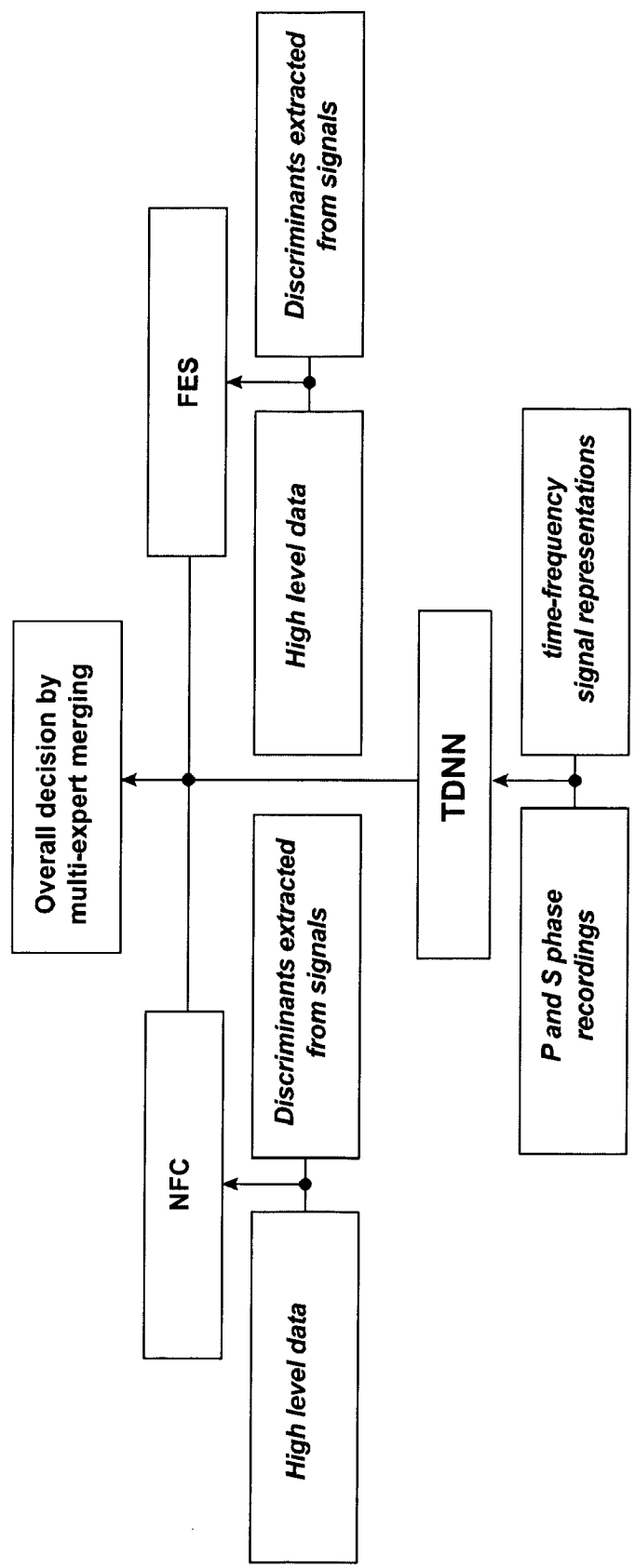
FIG. 4 shows the diagram of the principle of the multi-expert system for discrimination of seismic events according to the invention.

FIG. 4 shows the diagram of the principle of the multi-expert system for discrimination of seismic events according to the invention. This system is constituted of several independent processing branches, each with special properties, merged by a high level decisional system.

These branches are:
a neuro-fuzzy classifier, NFC, making its decisions from high level properties of events (for example for seismic events: localisation, magnitude, time, day of the week) and lower level parameters extracted from the signals by procedures of the signal processing type;
a fuzzy expert system, FES, taking a decision in an independent way from the same information, and able to explain its decision to the user through the intermediary of rules selected by order of applicability to the event being processed;
a neural network with local connections and shared weights, TDNN, constituted of banks of non-linear adaptable filters, itself extracting the relevant information for time-frequency representations from signals corresponding to the event.

These three branches configure themselves automatically by statistical learning on the data bases of seismic events.

Learning from Examples

Figure 5:
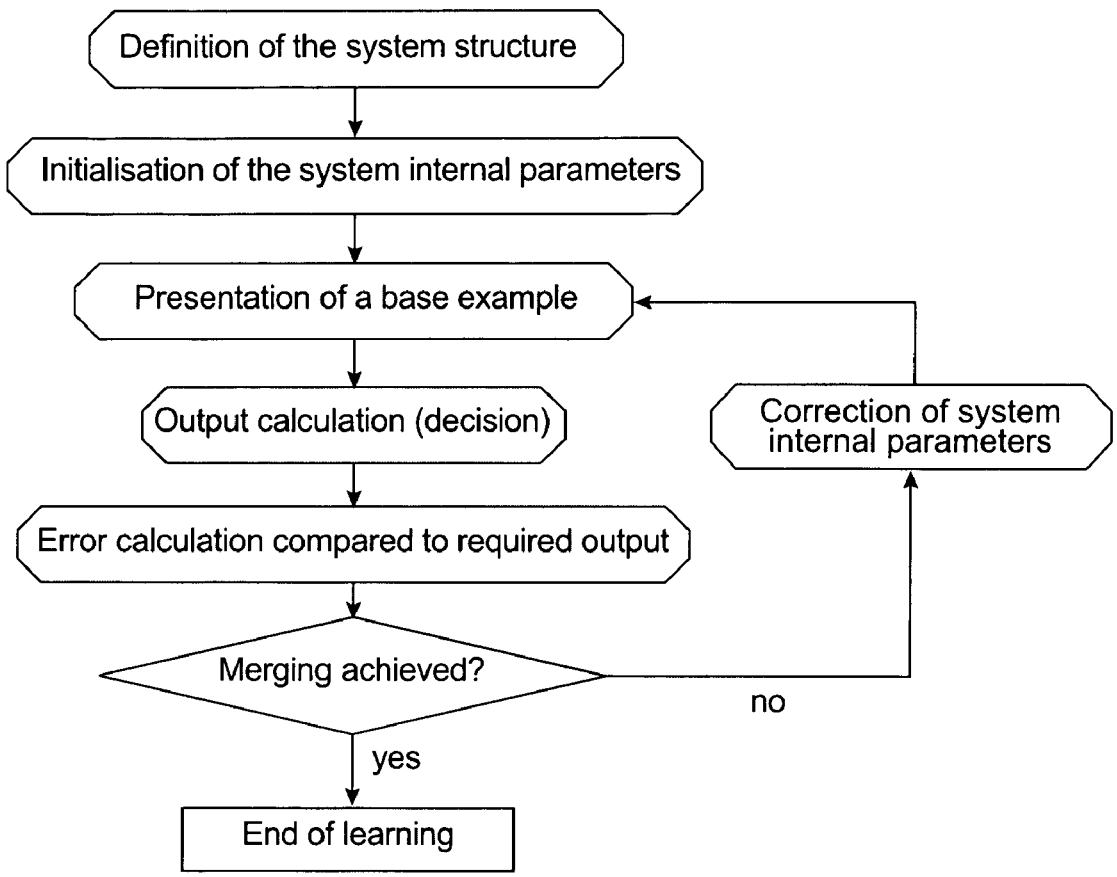
FIG. 5 shows the general learning diagram of the system according to the invention, from examples.

Learning from examples consists of building a model of the decision-making system by progressive adjustment of parameters based on data. This model must be able to associate the right decision (output) to a set of data describing the case being processed (inputs). This is carried out progressively, by iterative presentation of cases available in the example base inputting the system. Such a procedure is shown in the flow chart of FIG. 5.

According to the invention, the learning model can either be a network of artificial neurons or a fuzzy expert system.

Once the system has ended its learning phase, its internal parameters are set and the system is ready for use.

Neural Network of the "Multilayer Perceptron" Type

Such a network of artificial neurons of the "multilayer Perceptron" type is a special model of a neural network able to be used as a decision-making system. It is constituted of a network of robots for simple calculations, "artificial neurons".

Figure 6:
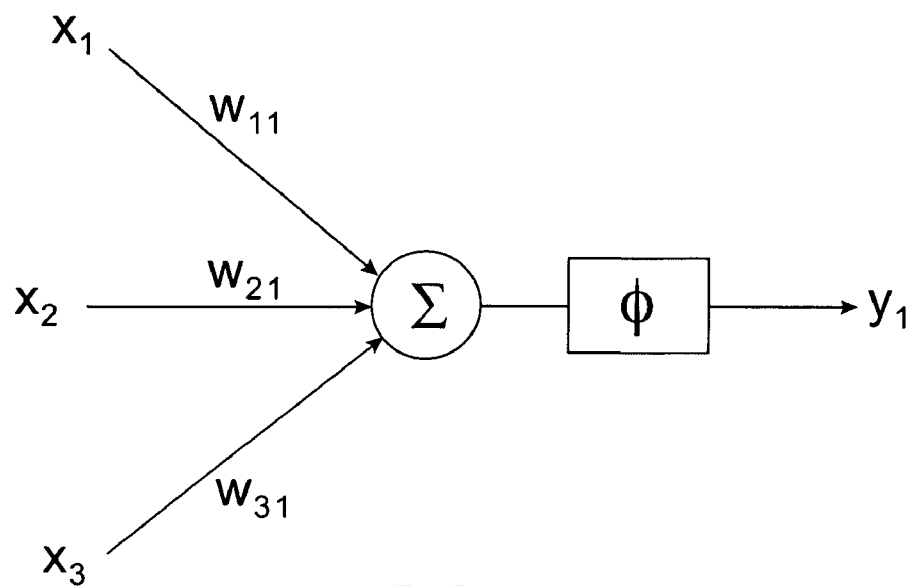
FIG. 6 shows an artificial neuron.

A neuron $N^j$, as shown in FIG. 6, is an entity constituted of a weight-vector $W_j = \{w_{ij}\}$ and a non-linear transfer function $\phi$. It allows a vector input $X = \{x_i\}$ and carries out a transformation of these inputs of the type $$y_J = \phi\left(\sum_i w_{ij} x_i\right).$$

Similar to the vocabulary used in neurophysiology, one says that each input $x_i$ is linked to the neuron $N^j$ by a synaptic connection. A synaptic weight $w_{ij}$ modulates the efficiency of this connection.

Figure 7:
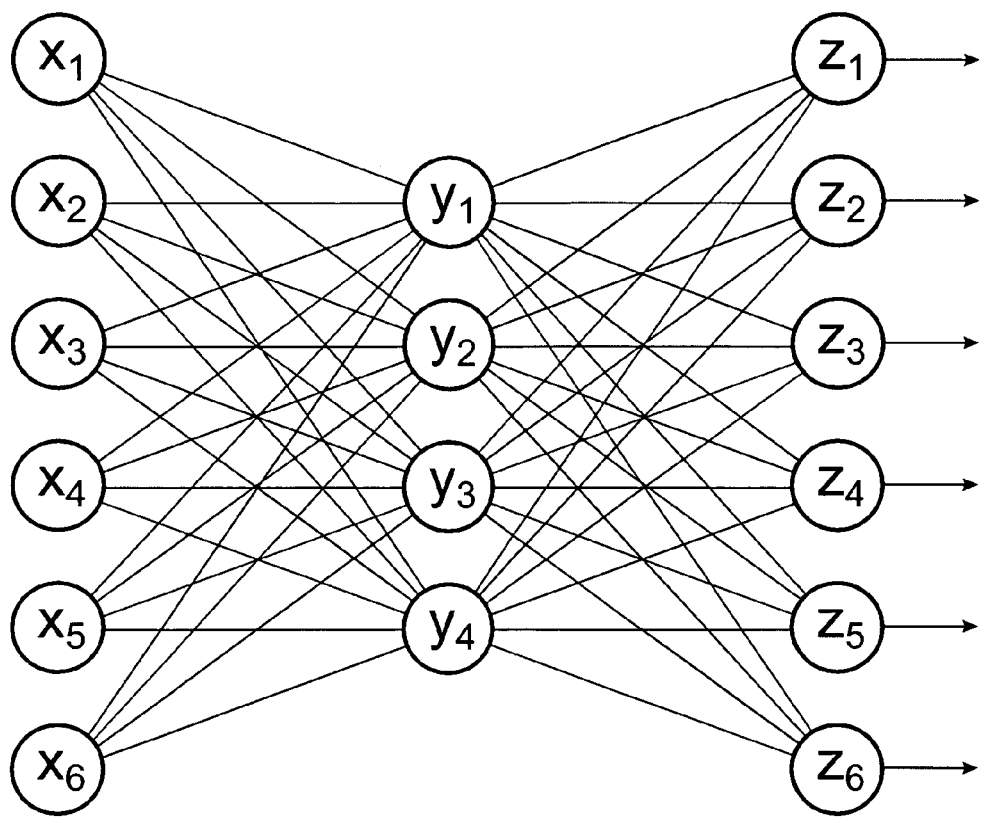
FIG. 7 shows a network of artificial neurons.

In a network of artificial neurons, as shown in FIG. 7, the neurons are assembled in successive layers. A layer is defined as a set of neurons not having connections between each other, but able to have connections with neurons of the preceding layers (inputs) or following layers (outputs). In general, only neurons of successive layers are connected.

Learning consists of progressively modifying the weights values $w_{ij}$ until the outputs of the network, which is constituted of a certain number of neuron layers, correspond to the required outputs.

In order to achieve this, one defines a classification error one wishes to minimise. The most commonly used error is the mean square error, defined by $$E = \sum_{k=1}^{Noutputs} (z_k - z_k^{required})^2.$$

The method consists of making a gradient decrease on the weights by the equation $$\Delta w_{ij} = -\alpha \frac{\partial E}{\partial w_{ij}}$$

with $\alpha > 0$. This equation, when developed, provides the correction formula for each weight of the network.

Fuzzy Expert System

A fuzzy expert system is another system model for decision-making. It has the advantage over a neural network of giving a form of explanation for its decisions. It is constituted of a set of calculation units, the "fuzzy inference rules".

A fuzzy inference rule is an entity of the form "if <premise> then <conclusion>". The premise is the part sought to put into correspondence with the input data.

In fact, a fuzzy set is a set whose borders are progressive, contrary to a classic set, which has defined borders. Thus an element is more or less part of each fuzzy set. When the data are of dimension 1, a classic set can be represented by a rectangle (membership=1 inside, 0 outside), whereas a fuzzy set can be a triangle, a trapezium a Gaussian form.

In the same way as above, learning consists of modifying progressively the parameter values until the outputs of the fuzzy expert system correspond to the required outputs.

Four types of parameters are calculated by learning: the position and width of the fuzzy sets of premises, the weights of the rules and the degree of activation of each class for each rule.

In the operational utilisation phase, the fuzzy expert system provides, besides the class attributed to a seismic event, the list of rules applicable by descending order of relevance. Some of these rules can be in contradiction with the others, which makes it possible to examine alternative solutions, but it is the aggregation of the result of all the rules which provides the overall result.

Therefore, at the disposal of the user, there exists:
the initial decision (earthquake, explosion, rock burst);
the list of applicable rules;
the list of rules in contradiction to this decision;
the reason for the decision of each rule (through examination of the coherence between the data and the corresponding fuzzy sets).

An example of decision rule found by the system is given below:

if (Time is the middle of the afternoon)
and (Latitude is very close to 43.5° N)
and (Longitude is very close to 5.5° E)
and (Magnitude is about 2.7)
and (Date is preferably Saturday)
then (with level of confidence=0.8)
(earthquake is improbable)
(explosion is probable)
(rock burst is improbable).

In the invention, for reasons of difficult convergence, this gradient is parameterised by introducing intermediate variables. If one wishes to carry out a gradient decrease on a parameter p with p=φ(s), φ being a differentiable function, strictly monotonic, independent from p and values of examples serving for learning, one has the same final solutions by carrying out a gradient decrease on s. The advantage of such a change of variable is that it becomes possible to change the way of reaching the solution, and in particular to facilitate convergence in difficult cases.

In the invention, the following parameters are optimised:

(1) The position y of the fuzzy sets of premises: when the gradient decrease is applied directly on this parameter, one generally obtains difficult convergence. This is explained by the fact that the variation of the position y of the fuzzy sets of premises is not an increasing function of the distance from the example. This phenomenon is corrected by posing $x=y/\sigma$.

(2) The width σ of the fuzzy sets of premises: when the data are structured in sets of very different sizes, the algorithm cannot converge. By studying the relative variation σ/σ, one discovers that it is not bounded (that is to say that nothing prevents it tending towards infinite values). When the data are very grouped, this variation does in actual fact take very high values. In order to have a lower relative modification when the data are close, one poses $s=\ln(2\sigma^2)$.

(3) The weights ρ of the rules: this is the most difficult parameter to set. With a direct gradient decrease, the lowest weights diminish and become negative, which makes them lose all significance and makes the algorithm diverge. Thus one chooses a function for positive activation by imposing a supplementary restriction: for different examples with the same activation level of the rule, the variation of this level must be the same if the conclusions are equal. The consequence is that the relative variation of the weights of the rules must be constant when the examples have the same degree of belonging to the fuzzy sets. This is carried out by posing $r=\ln(\rho)$.

(4) The degree of activation d of each class for each rule.

The gradient decrease is thus carried out not on y, σ and ρ, but on:

$x=y/\sigma$
$s=\ln(2\sigma^2)$
$r=\ln(\rho)$

For d, one does not carry out any change of variable. These changes in variables ensure very good quality of convergence and allow very efficient fuzzy expert systems to be obtained.

Base of Examples and Validation

The base of examples used must verify two fundamental principles:

to be qualitatively representative of the real problem (distribution of examples in conformity with the real distribution);

to be quantitatively representative of the problem (number of examples sufficient to constitute a satisfactory sampling).

There are several methodologies for learning and validation. In the simplest procedure, one divides the base of examples into two disjoined bases: the learning base and the test base. One trains the system by learning on the first and one verifies its correct operation on the second. A base of examples that does not conjointly verify the two properties mentioned above runs the risk of leading to a system incapable of generalising correctly, that is to say of operating on new examples, not presented during the learning stage.

Whether it concerns artificial neuron networks, fuzzy expert systems or more generally any system conceived by statistical learning on experimental data, it is of prime importance to use a base of examples which is adequate in quality and in quantity, and to validate the system produced by rigorous procedures.

DETAILED DESCRIPTION

Description of a Seismic Event

A seismic event to be identified can be described by:

the signals data coming from the network of seismic stations, or highest level properties, measurable directly or calculated by geophysical models. For example, one can use the location of the event (latitude and longitude), its magnitude and the moment it occurred (time and day of the week). For example the high level information is as follows: Thursday 7 Apr. 1966 at 12 hr, an earthquake of magnitude 1.4 occurred at longitude 02°35'06" East and latitude 49°12'25" North.

The Neuro-Fuzzy Classifier

Figure 8:
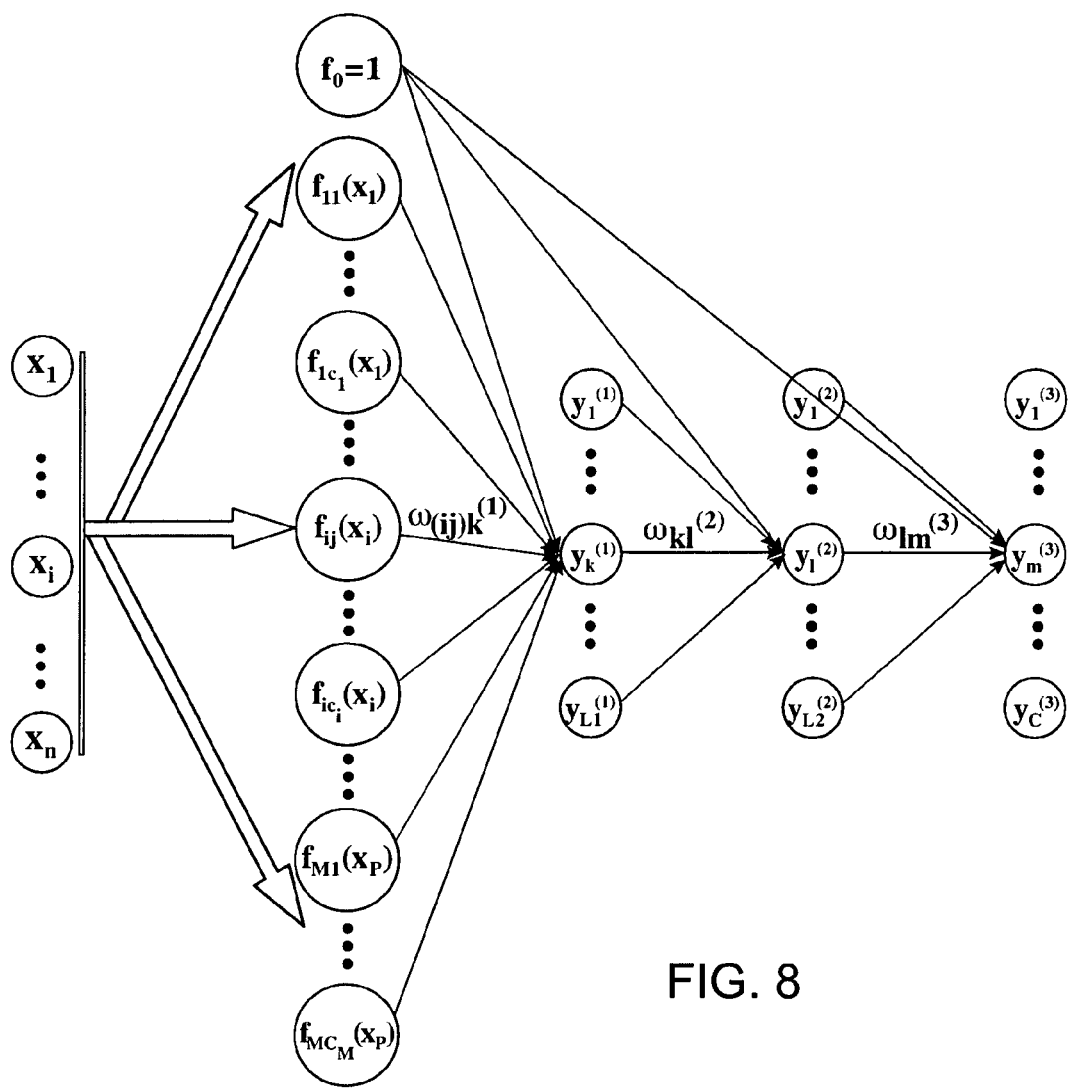
FIG. 8 shows a neuro-fuzzy classifier.

The neuro-fuzzy classifier (NFC expert), as shown in FIG. 8, is constituted of a neuro-fuzzy coding of the data followed by a multilayer perceptron. It is applicable to high level data.

Neuro-fuzzy coding consists of associating several coding cells to each input variable (or set of input variables), each cell having a region of influence modelled by a function defining its activation mechanism. The presentation of a vector of values then generates an activation diagram for the associated coding cells.

Figure 9:
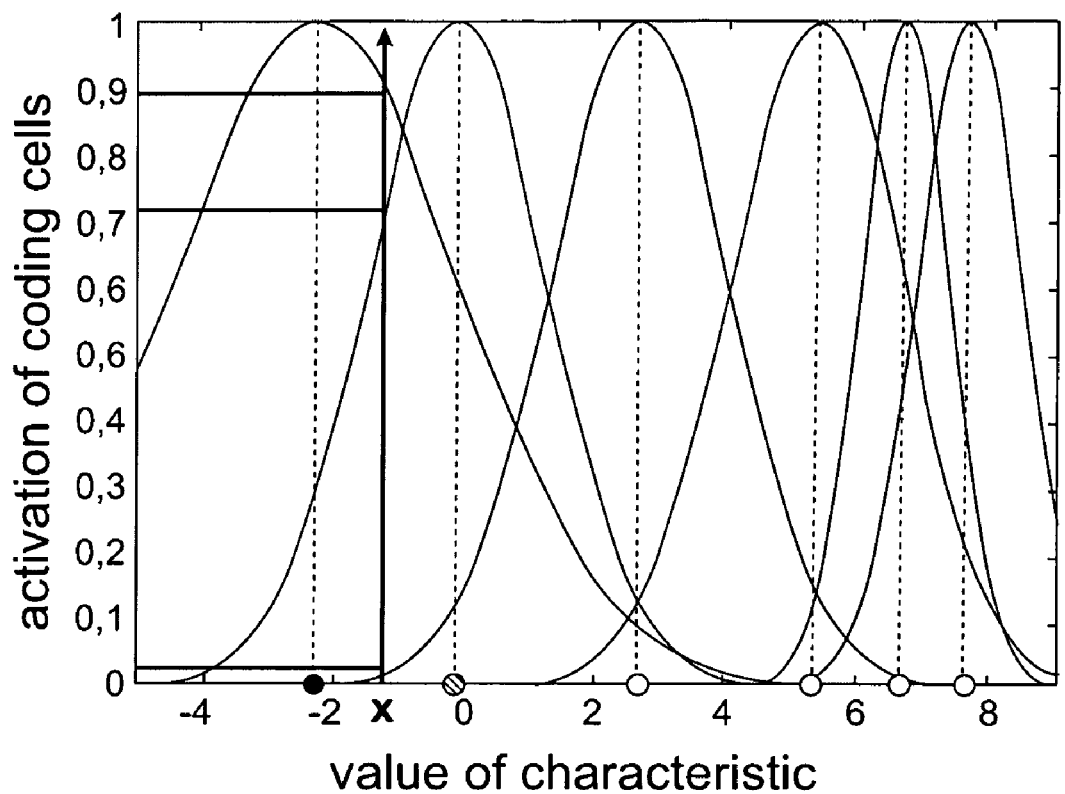
FIG. 9 shows a mechanism for activation of coding cells.

FIG. 9 shows this mechanism for activating coding cells. Presentation of a value generates an activation diagram corresponding to the impulse response of each activation function to the value presented. The levels of grey attributed to the centres of the cells indicates their activation level comprised between 0 and 1 (black: 1, white: 0).

Figure 10:
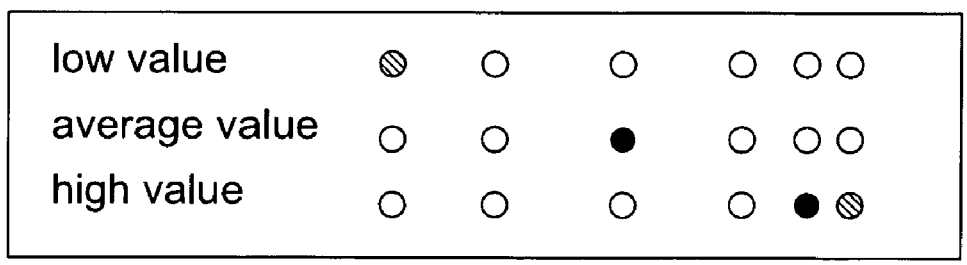
FIG. 10 shows examples of activation of coding cells.

FIG. 10 shows examples of activation diagrams generated by presentation of typical values. It concerns a coding of cursor type. The low values (or high respectively) preferentially activate the left cells (or right respectively).

The interests of this coding are multiple:

by its very nature, it makes it possible to represent incomplete, imprecise or uncertain data and to use them efficiently for the decision-making;

by its non-linear processing properties of data, it facilitates later processing (here, the classification).

This neuro-fuzzy coding is carried out in several successive stages: definition of sub-groups of characteristics, choice and placing of coding cells assigned to each group, definition of parameters for the region of influence of each cell. The details of this procedure are explained in a published document. S. Muller, P. Garda, J.-D. Muller, Y. Cansi "Seismic events discrimination by neuro-fuzzy merging of signal and catalogue features" (Physics Chemistry of The Earth (A), vol. 24, N°3, pp. 201-206, 1999).

Once the data have been coded, they are analysed by the multilayer perceptron which then calculates the class.

The Fuzzy Expert System

In an embodiment the system according to the invention comprises a single processing branch based on such a fuzzy expert system.

The fuzzy expert system (FES expert) is also applicable to high level data.

Figure 11:
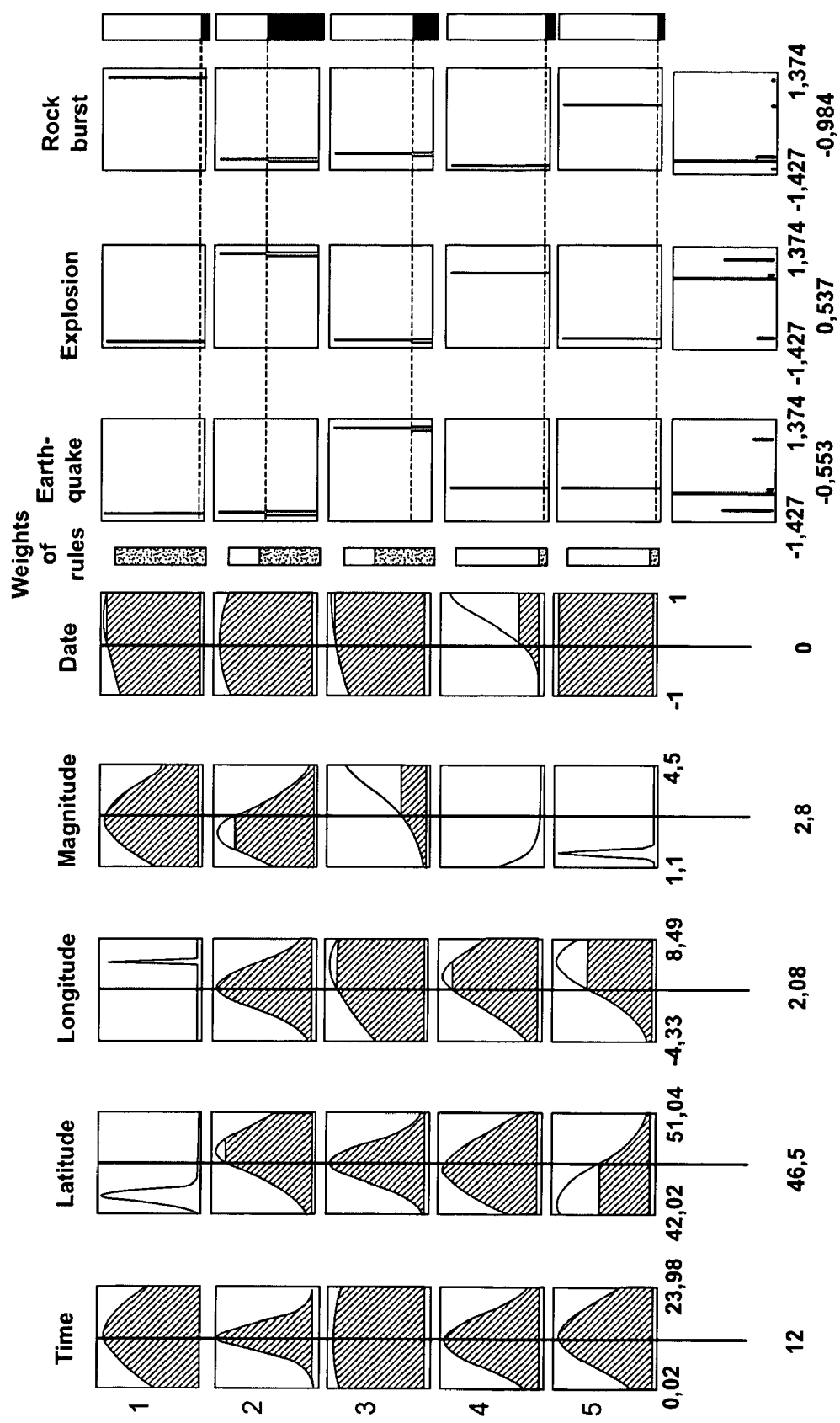
FIG. 11 shows a fuzzy expert system for the discrimination of seismic events.

In FIG. 11, a fuzzy expert system with five rules is shown (one rule per line).

For each line, the five columns on the left represent the premises and correspond to five entries: time, latitude, longitude, magnitude and date. The premises are composed of fuzzy sets in Gaussian form which cover the domains of the input variable leading to reinforcement of the activity of the rule.

Four types of parameters are calculated by learning: the position and the width of the fuzzy sets of premises (columns 1 to 5), the weights of the rules (column 6), which makes it possible to specify the degree of importance of each rule in the decision process, and the degree of activation of each class (natural earthquake, explosion or rock burst) for each rule (columns 7 to 9).

Each time an example to be classified is presented, a calculation is made of the contents of column 10 and column 6:

Column 10 gives the activation of each rule (and thus enables estimation of its fit with the case being processed).

Line 6 is the synthesis of the decisions from the five rules and gives the overall response of the fuzzy expert system (here, the decision is "explosion"). This synthesis is made by calculating the barycentre of the decisions from all the rules (columns 7 to 9) weighted by the corresponding activation level (column 10). In FIG. 11, the position of the barycentre for each class is symbolised by a vertical trace line 6, columns 7 to 9.

Learning is carried out in two stages:

a first phase consists of positioning the fuzzy sets (centres and widths), for example by means of an algorithm called fuzzy C-averages. B. T. W. Cheng, D. B. Goldgof, L. 0. Hall, "Fast fuzzy clustering" (Fuzzy Sets and Systems 93, 49-56, 1998).

a second phase consists of producing a gradient decrease on the four types of parameters.

Neural Network with Local Connections and Shared Weights

Contrary to the two preceding branches, the neural network with local connections and shared weights (TDNN expert) allows input of the seismic signals themselves and learns to extract by learning not only the decision procedure, but also the discriminant parameters which will serve as base for this decision. This neural network is of the multilayer perceptron type with local connections and shared weights taking as input the pre-processed spectrograms of seismic signals. A. Klaassen, X. Driancourt, S. Muller, J.-D. Muller, "Classifying regional seismic signals using TDNN-alike neural networks" (International Conference On Artificial Neural Networks '98. Skövde, Sweden, 2-4 Sep. 1998). These spectrograms are obtained by applying a sliding window Fourier transform on the signal.

FIGS. 12A to 12D show the successive pre-processing applied to each seismic signal, resulting in a final spectrogram with 15 frequency bands: FIG. 12A shows the initial signal; FIG. 12B shows the spectrogram deduced from the signal with 50 frequency bands; FIG. 12C shows the "noise-suppressed" spectrogram; FIG. 12D shows the spectrogram after reduction from 50 to 15 frequency bands.

The spectrogram obtained is then pre-processed and next presented as input for a neural network of the TDNN type. Each network is specialised in the treatment of signals recorded by a given station.

Figure 13:
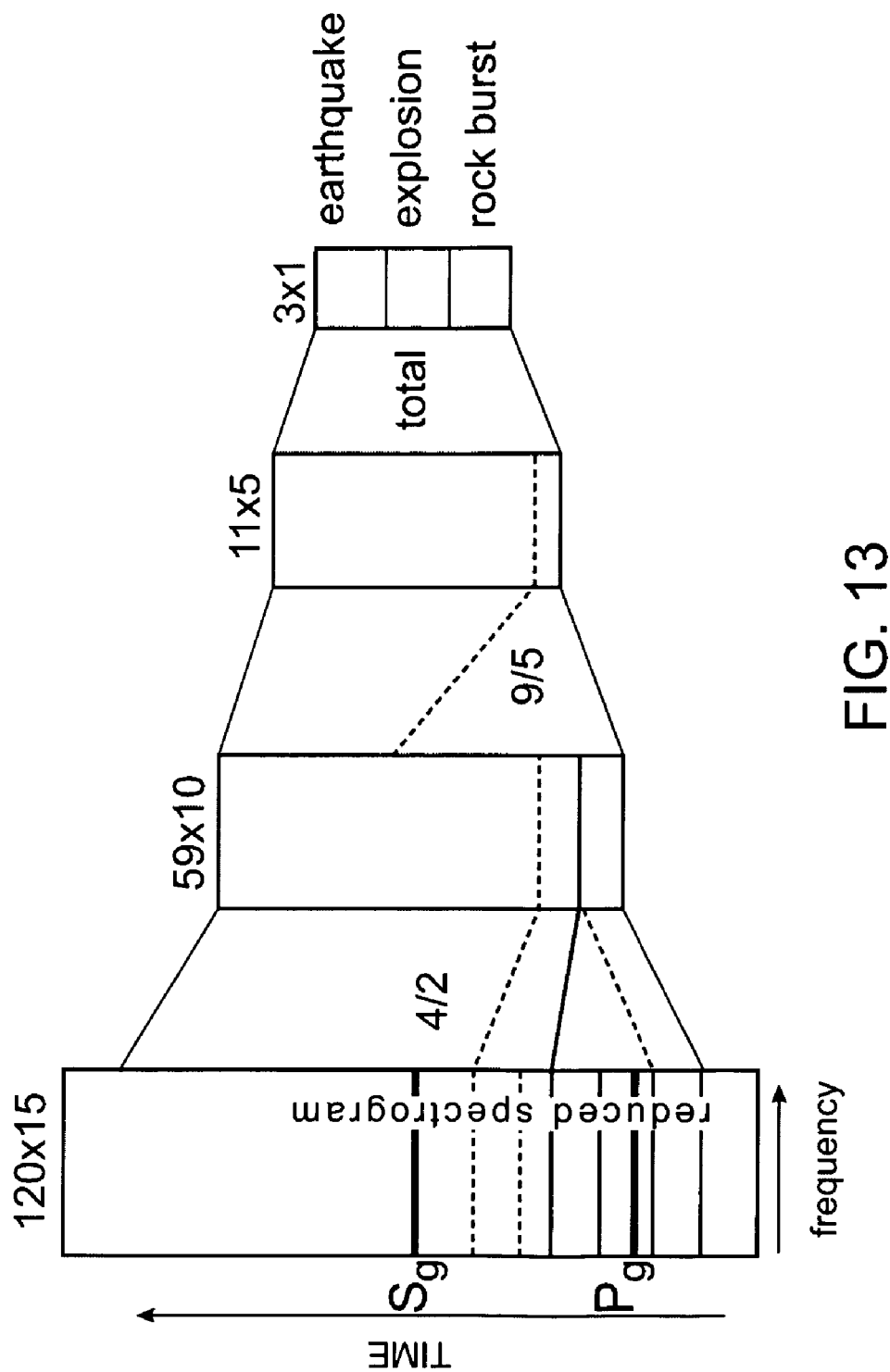
FIG. 13 is an architecture of a network of neurons with local connections and shared weights.

FIG. 13 shows the architecture of a TDNN network specialised in classification of spectrograms deduced from signals recorded by a given seismometer, this network comprising four neuron layers. The input layer has local connections and shared weights (4 frames with a delay of 2 frames) with the first hidden layer. The latter also has local connections with shared weights (9 frames with a delay of 5 frames) with the second hidden layer, totally connected to the last layer.

The shared weights make the architecture stronger for small differences in phase recordings or missing or erroneous frames. However, because of the speed of propagation of the P waves (compression) and S waves (shearing), the time between the arrival of phase P and phase S varies in function of the distance between the recording station and the epicentre of the event, which complicates learning. The solution adopted consists of aligning the recording of phase P on the 10th frame and that of phase S on the 60th frame.

Final Decision Making

For the final decision-making, it is assumed that all the outputs are comprised within the real interval [−1,1]. This decision-making consists of an association of answers provided by the three branches in order to increase reliability. In can be carried out by a calculation of mathematical average on the homologous outputs of each of the three branches. For each of the three outputs $S_i$ of the overall system one then has:

$$S_i{}_{i=1...3} = \frac{1}{3}\sum_{j=1}^{3} S_{ij}$$

where, $S_i$: final decision-making $S_{ij}$: decisions provided by the branches.

The certitude of the answer is evaluated by a coefficient calculable only if the system is in a situation for decision-making (that is to say if there is one and a single strictly positive output). This coefficient is then equal to the average of the absolute values of the outputs:

$$K = \frac{1}{3}\sum_{i=1}^{3} |S_i|$$

K<0.2: doubt
K∈]0.2, 0.4]: caution
K∈]0.4, 0.6]: reasonable certainty
K∈]0.6, 0.8]: high certainty
K>0.8: almost absolute certainty Thus, for example, one can obtain:

| System | Class chosen | Details of responses per class | Degree of certainty |
| --- | --- | --- | --- |
| 1 | Class 3 | (−0.9 −0.4 + 0.8) | 0.7 high certainty |
| 2 | Undetermined 1 or 3 | (+0.1 −0.5 + 0.3) | Complete uncertainty |

-continued

| System | Class chosen | Details of responses per class | Degree of certainty |
|---|---|---|---|
| 3 | Class 1 | (+0.2 −0.6 − 0.2) | 0.3: caution |
| Fusion | Class 3 | (−0.2 −0.5 + 0.3) | 0.3: caution |

Example of Implementation of the Invention: Discrimination of Regional Seismic Events Localisation of the Event The discrimination "natural event/artificial event" is a major step in seismic surveillance, carried out rapidly from reading the signals during the reduction stage, and then improved with each new processing. It is estimated that nearly seven years are needed for analysts to become completely operational. Since these analysts are real experts, it is difficult to describe their reasoning method clearly, since it is based both on expert know-how and on case-by-case reasoning.

The location of a seismic event is obtained after a succession of exchanges between two principal stages:
  the recording of the different seismic phases carried out on signals registered by stations detecting the event and the calculation of the magnitude;
  the localisation itself, carried out by a mathematical model created by seismologists.

After the recording stage, the localisation of the event can be carried out using a simulation software known to those skilled in the art. It uses seismological models containing information about the speed of waves, the different types of waves and their propagation mode, altitude corrections according to stations etc. Several localisation hypotheses are proposed, associated to a degree of data consistency. If they do not satisfy the expert, he modifies his phase recordings and then restarts a localisation search. This cycle is repeated until a result considered to be satisfactory is obtained.

The quality of the localisation depends on the number and quality of the stations used for localising the event, together with their azimuth distribution. In general, events located in France are better localised than events abroad. To improve localisation in the latter case, experts regularly consult data from abroad. With French data alone, the precision of localisation of events in France is on average five kilometers. In the best of cases, it is estimated at about one kilometer.

Table II at the end of the description gives an example of the results provided by the localisation procedure. The upper part resumes the results obtained: for each value of time of origin, of magnitude and localisation (latitude-longitude) an estimated level of inaccuracy is associated. The lower part names the stations taken into account for the localisation and the mean square errors (MSE) obtained as a function of the hypothesis of epicentre depth. In the case of rock bursts, the depth is set arbitrarily at a depth of one kilometer.

Characterization of the Event

Here we are concerned by local and regional seismic events, meaning those in mainland France or adjacent regions. These events are often described as close as opposed to distant teleseisms (epicentre situated at several thousands of kilometers from the sensor).

Three types of seismic events have to be discriminated:
  earthquakes, seismic events of natural origin;
  terrestrial explosions (blasting in mines, quarries, work-sites etc.) or in the sea (bomb disposal, weapons testing etc.);
  rock bursts corresponding to the collapse of a mining layer and associated with the operation of the mine.

Analysis of the state of the art has demonstrated the failure of approaches based on discrimination relying on seismic signals alone. Thus one needs to use all the available data by adopting an approach based on multi-expert and multi-source merging. The concept of the system of automatic discrimination of seismic events is based on three modules:
  the first two (NFC and FES experts) are modules carrying out discrimination from high level data only, deduced by the inverse model of the LDG laboratory. Thus, at this level, no seismic signal is taken into account directly;
  the third (TDNN expert) is based on the analysis of the seismic signals.

Data Used

Figure 14:
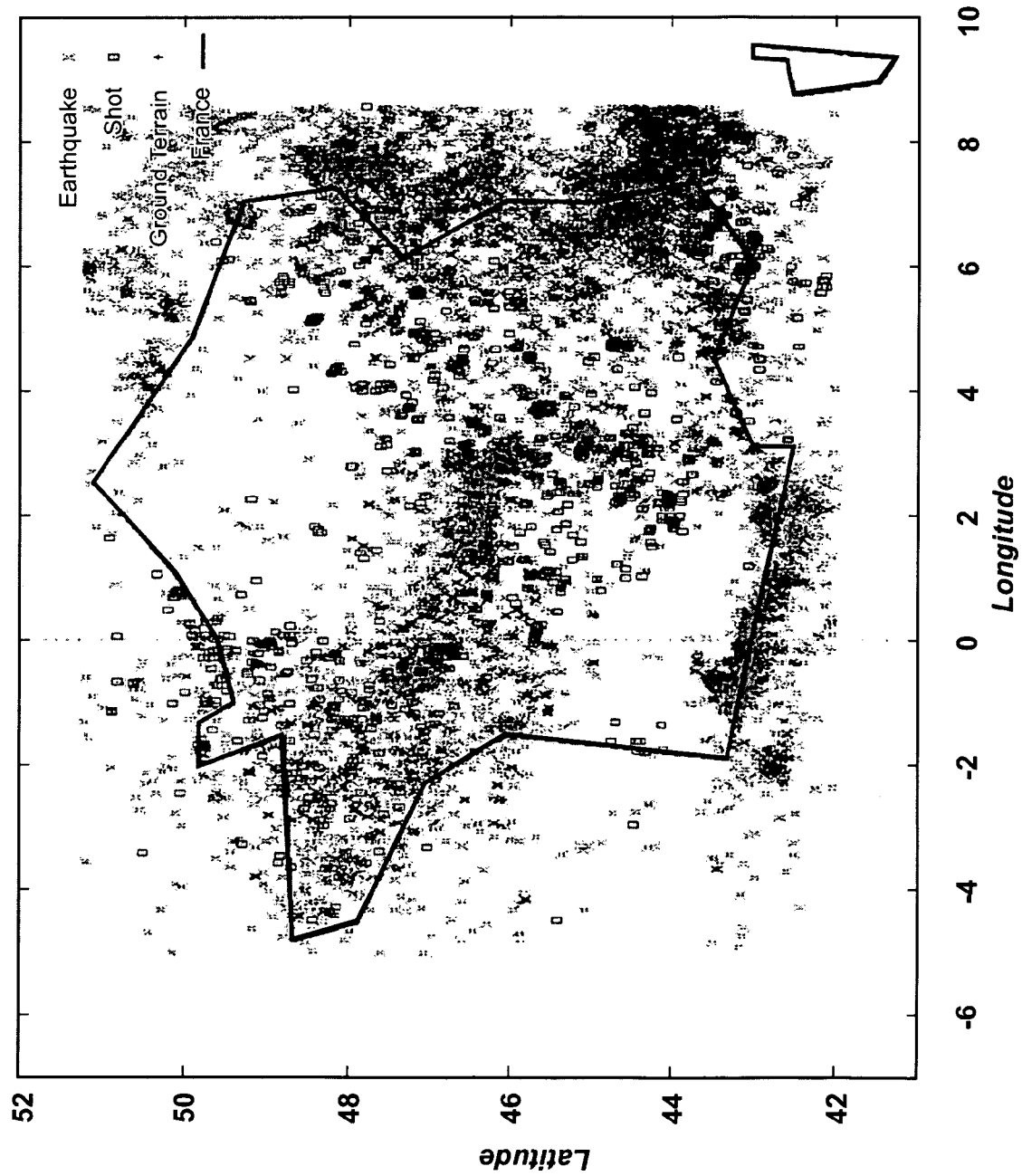
FIG. 14 shows the spread of epicentres of seismic events between 1962 and 1996.

Geographic Spread of Events:

The seismic events to be analysed are spread over the whole of French mainland territory and an adjacent perimeter. The epicentres of the events recorded by the LDG laboratory between 1962 and 1996 are shown in FIG. 14.

High Level Data:

Each seismic event is characterised by the following information: the date and time of origin of the event, the latitude and longitude of the epicentre, and its magnitude.

The time and the date are stored because of the rules about quarry or mine blasting in France, forbidding blasting at night or during weekends or public holidays. Nonetheless, permission is given for certain work-sites, for example to avoid disturbing traffic.

The magnitude is recorded since, according to seismologists, rock bursts reach a typical magnitude (about 3). Furthermore, only earthquakes can produce greater magnitudes. Several values of magnitude are taken into account when they are available.

The localisation of the epicentre, characterised by its latitude and its longitude, is also a major characteristic. However, there are certain mines located in regions of high seismicity and capable of provoking rock bursts.

Figure 1:
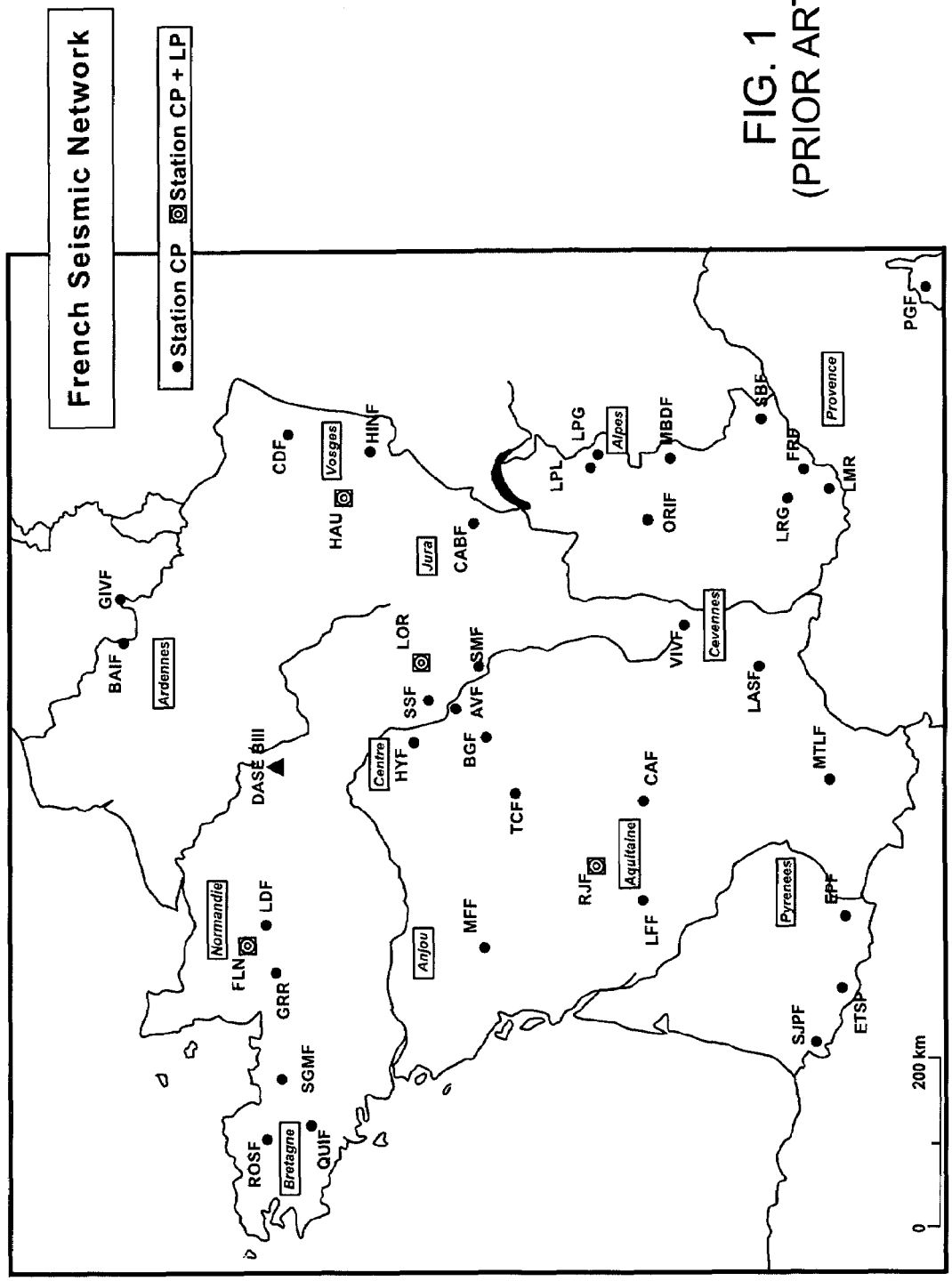
FIG. 1 shows the network of seismometers belonging to the laboratory for detection and geophysics (LDG) of the centre for atomic energy (CEA) in 1998.
Figure 2:
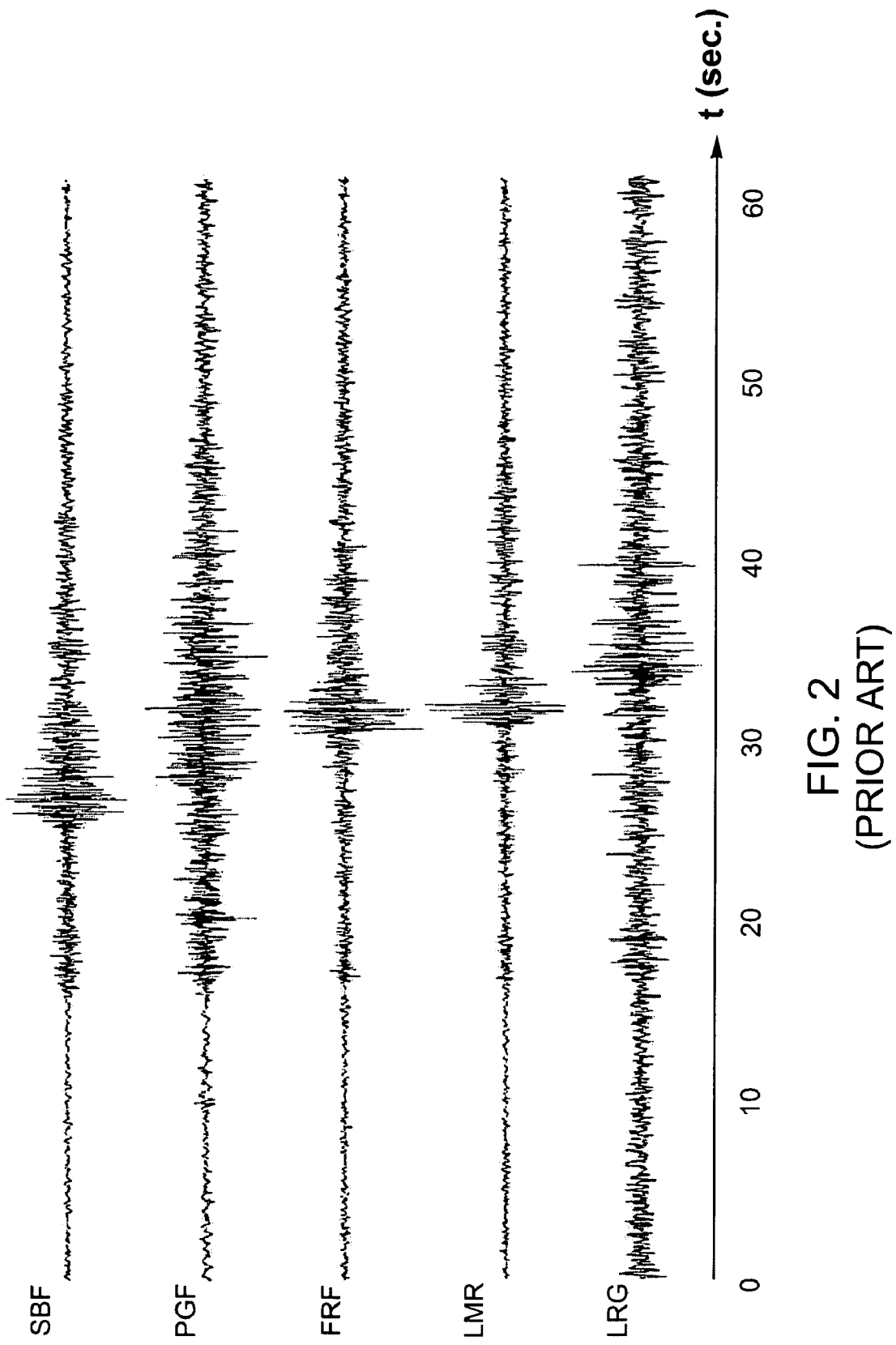
FIG. 2 shows examples of seismic signals recorded by the network of FIG. 1.
Figure 3:
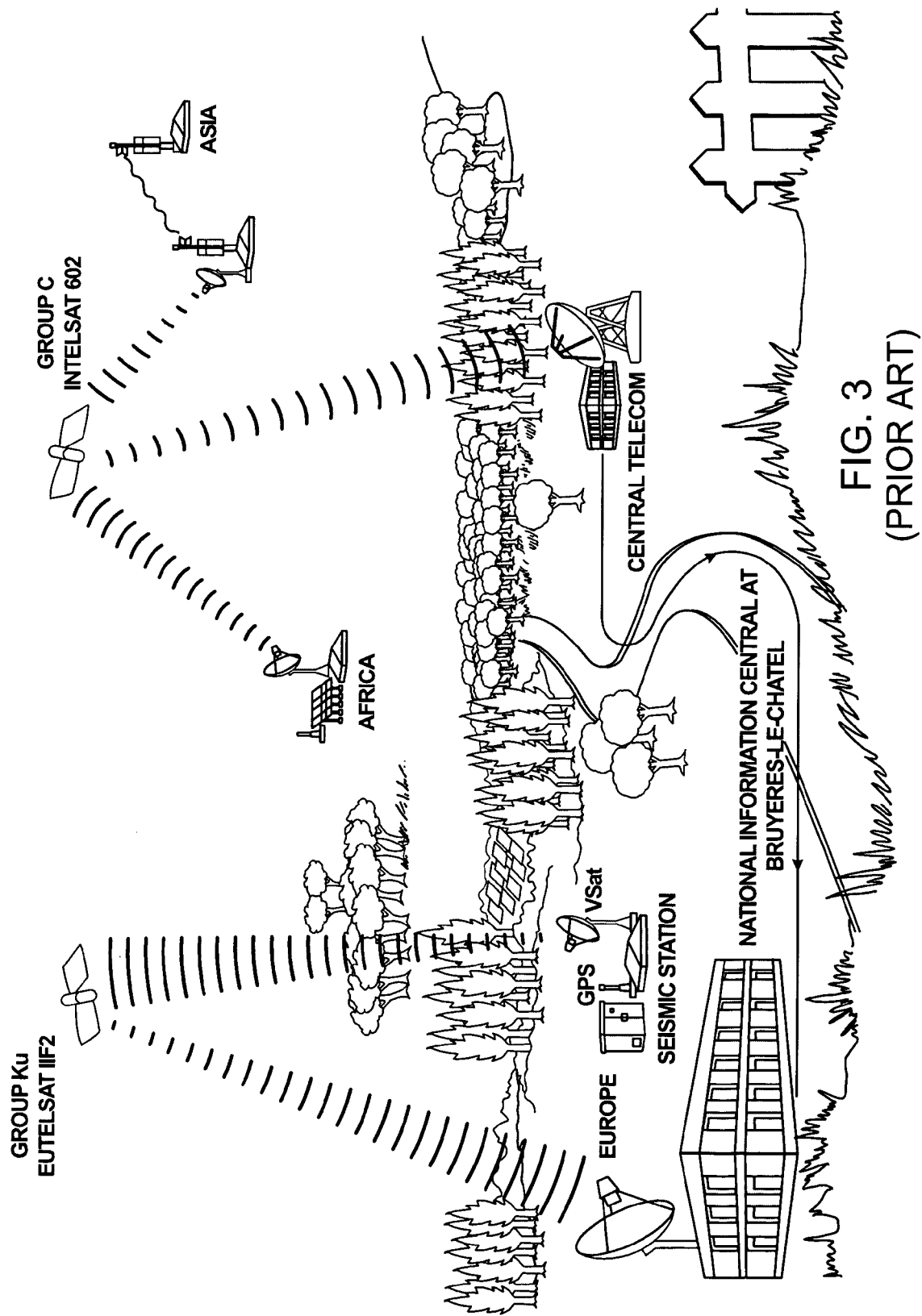
FIG. 3 shows a prior art global system for exploitation of geophysical systems.

Low Level Data:

Low level data are signals arriving from the 42 seismic stations of the LDG laboratory (see FIG. 1). The pre-processing relates essentially to the creation of spectrograms of seismic signals, which are non-stationary. These spectrograms are obtained by application of a sliding window Fourier transform on the signal. To begin with, the signal sampled at 50 Hz, is segmented into two-second frames delayed by one second by a Hamming code window. Next, the spectral energy density is calculated for 50 frequency bands, eliminating the continuous component. Then a logarithmic transformation is applied with noise suppression, with a supposedly logarithmic model, in each band according to the equation $\max(\ln(1+x)-\mu(noise)-\sigma(noise), 0)$, where $\mu(noise)$ and $\sigma(noise)$ correspond to the average and the deviation type of the noise estimated over a period anterior to the recording of the wave P. Finally, the number of frequency bands is reduced from 50 to 15 through a pseudo-logarithmic compression of high frequencies.

Results Obtained

The system described above classifies French regional seismic events with the following level of performance:
  86% for earthquakes;
  91% for explosions;
  greater than 99% for rock bursts.

The overall level of performance is about 90%.

TABLE I

CLOSE BULLETIN: 09 SEP. 1998 TO 15 SEP. 1998    P 1998-037
CLOSE EARTHQUAKES-SUMMARY-No. EVENTS: 34

| DATE | TIME OR. | LAT | LON | DEP | LM | MSE | | REGION |
|---|---|---|---|---|---|---|---|---|
| 09 Sep | 4 19 55.8 | 44.15 N | 11.50E | 2 | 2.9 | .8 | 44 km | SE Bologne |
| 09 Sep | 11 27 39.3 | 39.79 N | 16.28E | 2 | 5.0 | 1.4 | 162 km | S Bark |
| 09 Sep | 11 33 35.6 | 44.43 N | 9.83E | 2 | 3.0 | .7 | 71 km | S Gaden |
| 09 Sep | (PST = 20H 56min) | | | | | | | |
| 10 Sep | 7 19 30.1 | 45.63 N | 21.18E | 2 | 2.7 | 2.3 | 49 km | W Trents |
| 10 Sep | 15 41 48.2 | 40.67 N | .36W | 5 | 3.0 | 1.3 | 57 km | W Vinarer |
| 10 Sep | 18 13 40.7 | 43.07 N | .40W | 2 | 2.3 | .3 | 22 km | SE Gloron-Sts-Marie (64) |
| 10 Sep | 20 41 27.3 | 43.41 N | 6.66W | 2 | 2.2 | .7 | 29 km | NW Saint-Jean-de-Hurricane (73) |
| 11 Sep | 8 51 55.4 | 42.03 N | 9.53W | 2 | 2.3 | .3 | 44 km | SE Corte |
| 11 Sep | 11 28 46.9 | 64.69 N | 7.18E | 2 | 2.2 | .3 | 44 km | NW Cunan |
| 12 Sep | 4 28 48.2 | 42.92 N | .20E | 5 | 1.8 | .2 | 17 km | S Baperes-de-Rigocrs (63) |
| 12 Sep | 5 30 20.9 | 45.49 N | 6.67E | 2 | 1.7 | .2 | 29 km | SE Saint-Jean-de-Maurisma (73) |
| 12 Sep | 8 47 31.6 | 44.61 N | 30.22E | 2 | 2.7 | .6 | 30 km | N Bologne |
| 12 Sep | 9 40 56.6 | 43.27 N | 1.48E | 2 | 2.5 | .1 | 66 km | Baroalone |
| 12 Sep | 9 46 6.3 | 44.06 N | 32.72E | 2 | 3.1 | .6 | 78 km | Ancone |
| 12 Sep | 13 56 44.3 | 47.96 N | 2.55E | 2 | 1.8 | .5 | 34 km | St Pontivy (56) |
| 12 Sep | 22 13 10.3 | 31.47 N | 6.88E | 2 | 2.8 | .3 | 29 km | N Dusseldorf |
| 13 Sep | 2 9 31.5 | 46.12 N | 7.94E | 2 | 2.4 | .6 | 36 km | SE Sierre |
| 13 Sep | 4 23 28.3 | 39.64 N | .75W | 2 | 2.8 | .6 | 35 km | NW Valence |
| 13 Sep | 15 41 37.2 | 43.05 N | .48W | 2 | | .2 | 39 km | SE Olcron-Sts-Marie (64) |
| 14 Sep | 3 33 33.0 | 44.28 N | 10.93E | 2 | 3.4 | .3 | 41 km | SW Bologne |
| 14 Sep | 5 24 49.7 | 38.20 N | 13.03E | 2 | 4.0 | 1.3 | 32 km | N Palerne |
| 14 Sep | 6 37 37.4 | 44.37 N | 10.62E | 2 | 2.7 | 1.0 | 59 km | W Bologne |
| 14 Sep | 9 7 36.6 | 68.10 N | 7.94E | 14 | 3.8 | .3 | 33 km | Frelburg-in-Brigand |
| 14 Sep | 10 21 31.6 | 46.26 N | 10.99E | 2 | 3.2 | .5 | 44 km | SW Bologne |
| 14 Sep | 13 57 14.0 | 48.05 N | 3.54W | 22 | | .1 | 36 km | N Lorient (56) |
| 14 Sep | (PGT = 17H 6min) | | | | | | | |
| 14 Sep | 17 11 2.3 | 46.18 N | 6.79E | 2 | 2.0 | .4 | 32 km | SE Thonon-lei-Bains (74) |
| 14 Sep | 19 35 8.1 | 43.63 N | 12.42E | 2 | 2.8 | .4 | 59 km | N Paroaga |
| 14 Sep | 22 39 44.4 | 44.68 N | 7.60E | 2 | 2.1 | .7 | 31 km | N Congo |
| 15 Sep | 6 24 25.7 | 43.59 N | 7.69E | 19 | 2.5 | .3 | 24 km | S San Remo |
| 15 Sep | 15 48 1.0 | 43.47 N | .65W | 2 | 2.7 | .4 | 30 km | NW Pau (64) |
| 15 Sep | (ETST = 18H 6min) | | | | | | | |
| 15 Sep | 23 3 52.8 | 44.22 N | 18.77E | 2 | 2.7 | .5 | 54 km | SW Bologne |

TIME OR: time of origin (TU)
LAT: latitude of epicentre (deg)
LON: longitude of epicentre (deg)
DEP: depth of epicentre (km)
LM: local magnitude
MSE: mean square error (s)

TABLE II 100596 probul.dat /data/sismic/exploit/dat/P19190.131.tou37:06 METDST 1
Number of stations used 11 - Res in bulletin:yes
preloc. lat: 43.2 lon: 5.4 hr: 19 19 53.1

| region: 11 km S air-en-Provence (13) | | rms: .289 nb d'iter: 3 | |
|---|---|---|---|
| *rock burst* | | Ellipse: 95% confidence | |
| Time of origin: | 19 19 53.8 +/− .3 | ½ long axis | 7.0 km. |
| latitude: | 43.43 +/− 1.7 | ½ short axis | 4.6 km. |
| longitude: | 5.43 +/− 2.5 | azimuth long axis: | 169.5 degrees |
| Depth: | 1. km set | | |
| magnitudes: | | | |
| ampl. | 2.8 +/− 9.9 sur 1 station | | |
| Duration: | 2.7 +/− .0 sur 2 stations | | |

| | pro | 1. km | 2. km | 15. km | 25. km | 30. km |
|---|---|---|---|---|---|---|
| | lat | 43.43 | 43.44 | 43.50 | 43.53 | 43.36 |
| | lon | 5.43 | 5.44 | 5.51 | 5.59 | 5.34 |
| | rms | .29 | .32 | .98 | 1.65 | 1.90 |
| | nit | 3 | 3 | 5 | 8 | 8 |

| code | ph | <Time> | | dist | azi | ampl | per | dur | res | ml | md | res | res | res | res |
|---|---|---|---|---|---|---|---|---|---|---|---|---|---|---|---|
| LRG | pg | 19 20 | 6.5 | 75 | 87 | | | | −.1 | | | −.1 | −.9 | −1.7 | −1.9 |
| FRF | pg | 19 20 | 10.4 | 99 | 81 | | | 50. | −.2 | 2.7 | | −.2 | −.8 | −1.3 | −1.0 |
| FRF | sg | 19 20 | 21.8 | 99 | 81 | | | | −.4 | | | −.4 | −.3 | −.3 | −1.5 |
| LMR | pg | 19 20 | 8.7 | 87 | 96 | | | 50. | .0 | 2.7 | | −.1 | −1.0 | −1.8 | −1.1 |
| LMR | sg | 19 20 | 18.8 | 87 | 96 | | | | −.2 | | | −.3 | −.8 | −1.2 | −1.7 |
| SBF | pg | 19 20 | 21.8 | 168 | 72 | 22.4 | .4 | | −.3 | 2.8 | | −.3 | −.7 | −1.0 | 1.8 |

TABLE II-continued 100596 probul.dat /data/sismic/exploit/dat/P19190.131.tou37:06 METDST 1
Number of stations used 11 - Res in bulletin:yes
preloc. lat: 43.2 lon: 5.4 hr: 19 19 53.1

| SBF | pn | 19 | 20 | 20.8 | 168 | 72 | .5 | .6 | 1.4 | 2.1 | .9 |
| SBF | sg | 19 | 20 | 41.9 | 168 | 72 | .3 | .3 | .8 | 1.1 | 3.5 |
| PGF | pn | 19 | 20 | 37.1 | 307 | 107 | −.2 | −.2 | .1 | .6 | .7 |
| PGF | sn | 19 | 21 | 9.8 | 307 | 107 | .4 | .5 | 2.0 | 3.7 | 2.6 |
| LRG | sg | 19 | 20 | 15.8 | 75 | 87 | .3 | .3 | .1 | −.3 | −2.3 |

[2] P. S. Dysart and J. J. Pulli, "Regional seismic event classification at the NORESS array: seismological measurement and the use of trained neural networks" (Bulletin of Seismological Society of America, vol. 80, pp 1910-1933, 1990).

The invention claimed is:

1. An artificial intelligence system for classification of events of geophysical recordings, comprising:
    a neuro-fuzzy classifier branch for making a decision from high level properties of the events of geophysical recordings and lower level parameters extracted from signals by signal processing type procedures;
    a fuzzy expert system branch for generating a decision and explaining the decision to a user through an intermediary of rules selected by order of applicability of the events of geophysical recordings; and
    a neural network branch with local connections and shared weights, formed by banks of non-linear adaptable filters, the neural network is extracting relevant information for time-frequency representations from signals corresponding to the events of geophysical recordings,
    wherein the branches are automatically configured by statistical learning of the events of geophysical recordings in a database.

2. The system according to claim 1 wherein the fuzzy expert system with a gradient decrease is carried out on the parameters:

$x = y/\sigma$ $s = \ln(2\sigma^2)$ $r = \ln(\rho)$ d with:
    y: position of fuzzy sets of premises
    σ: width of fuzzy sets of premises
    ρ: weights of rules
    d: degree of activation of each class for each rule
    x: convergence value of a position of the fuzzy sets of premises
    s: convergence modification of the width of fuzzy sets of premises
    r: constant weights of the rules.

3. The system according to claim 1, in which the high level properties are a localisation, a magnitude, a time and a date.

* * * * *